(12) United States Patent
Kuroda et al.

(10) Patent No.: US 9,090,479 B2
(45) Date of Patent: Jul. 28, 2015

(54) CERAMIC POWDER, DIELECTRIC COMPOSITE MATERIAL CONTAINING THE CERAMIC POWDER, AND DIELECTRIC ANTENNA

(75) Inventors: Masatoshi Kuroda, Osaka (JP);
Takahisa Yamashita, Osaka (JP);
Kazutoshi Sanada, Otake (JP);
Shinsuke Maruyama, Otake (JP)

(73) Assignees: SUMITOMO ELECTRIC INDUSTRIES, LTD., Osaka-shi, Osaka (JP); TODA KOGYO CORP., Otake-shi, Hiroshima (JP)

( * ) Notice: Subject to any disclaimer, the term of this patent is extended or adjusted under 35 U.S.C. 154(b) by 1178 days.

(21) Appl. No.: 13/062,164

(22) PCT Filed: Sep. 7, 2009

(86) PCT No.: PCT/JP2009/065596
§ 371 (c)(1),
(2), (4) Date: May 11, 2011

(87) PCT Pub. No.: WO2010/027074
PCT Pub. Date: Mar. 11, 2010

(65) Prior Publication Data
US 2011/0227796 A1 Sep. 22, 2011

(30) Foreign Application Priority Data
Sep. 5, 2008 (JP) .................................. 2008-229022

(51) Int. Cl.
| | |
|---|---|
| H01Q 1/38 | (2006.01) |
| C04B 35/46 | (2006.01) |
| B32B 5/16 | (2006.01) |
| C01G 23/04 | (2006.01) |
| C01G 23/00 | (2006.01) |
| H01Q 9/04 | (2006.01) |

(52) U.S. Cl.
CPC ................ *C01G 23/04* (2013.01); *C01G 23/00* (2013.01); *C01G 23/006* (2013.01); *H01Q 1/38* (2013.01); *H01Q 9/0407* (2013.01); *C01P 2004/61* (2013.01); *C01P 2004/62* (2013.01); *C01P 2006/12* (2013.01); *C01P 2006/40* (2013.01); *Y10T 428/2982* (2015.01)

(58) Field of Classification Search
CPC .............. H01B 3/12; H01B 3/00; C08K 3/22; C08K 13/06; C08L 101/00
USPC .......................................... 428/402; 501/134
See application file for complete search history.

(56) References Cited

U.S. PATENT DOCUMENTS

| | | |
|---|---|---|
| 2002/0067317 A1 | 6/2002 | Sakurada |
| 2006/0078492 A1 | 4/2006 | Kurozumi et al. |
| 2007/0049485 A1 | 3/2007 | Tanabe et al. |

FOREIGN PATENT DOCUMENTS

| | | | |
|---|---|---|---|
| CN | 1149567 A | 5/1997 | |
| EP | 1 065 693 | 1/2001 | |
| EP | 1 798 200 A1 | 6/2007 | |
| JP | 1-167227 | 6/1989 | |
| JP | 2001-72418 | 3/2001 | |
| JP | 2001-287997 | 10/2001 | |
| JP | A-2003-238243 | 8/2003 | |
| JP | 2004-323344 | 11/2004 | |
| JP | 2005-75700 | 3/2005 | |
| JP | 2005-093096 A | 4/2005 | |
| JP | 2005-94068 | 4/2005 | |
| JP | 3664094 | 4/2005 | |
| JP | 2005-093096 | * 7/2005 | ............... C08K 3/22 |
| JP | 3895175 | 12/2006 | |
| WO | 2004/092070 | 10/2004 | |
| WO | 2005/093763 | 10/2005 | |
| WO | 2008/081773 | 7/2008 | |

* cited by examiner

*Primary Examiner* — Robert Harlan
(74) *Attorney, Agent, or Firm* — Drinker Biddle & Reath LLP (57) ABSTRACT

Ceramic powder having a BET specific surface area within a range of from 0.1 to 2.0 m$^2$/g as measured according to the N$_2$ absorption method and an average particle diameter within a range of from 0.8 to 100 μm and composed of titanium oxide or a titanate; a dielectric composite material containing a synthetic resin and the ceramic powder; and a dielectric antenna with an antenna part formed of a conductor circuit provided on a dielectric substrate formed from the dielectric composite material.

6 Claims, 3 Drawing Sheets

CERAMIC POWDER, DIELECTRIC COMPOSITE MATERIAL CONTAINING THE CERAMIC POWDER, AND DIELECTRIC ANTENNA

TECHNICAL FIELD

The present invention relates to ceramic powder composed of titanium oxide or a titanate and having novel characteristics. The present invention also relates a dielectric composite material containing a synthetic resin and the ceramic powder and exhibiting dielectric characteristics formed of a combination of a high relative dielectric constant ($\in_r$) and a low dielectric loss tangent (tan δ). The present invention further relates to a dielectric antenna having a structure that an antenna part formed of a conductor circuit is provided on a dielectric substrate formed from the dielectric composite material.

BACKGROUND ART

In order to meet a high demand for miniaturization and weight saving of various radiocommunication instruments, it is necessary to miniaturize an antenna mounted thereon.

For example, a portable telephone resides in a technical field particularly high in market demand for miniaturization and weight saving because it is a portable information communication device. The portable telephone has labored in housing the whole device in a small housing (case) from the beginning of its development. Recently, more miniaturization has been required because it is necessary to also mount antennas for GPS (global positioning system) and information communications different in frequency in addition to the antenna for telephone. More specifically, the portable telephone tends to increase the kinds of information taken, and frequency bands used are different from one another according to the kinds of information taken, for example, telephone (0.8 GHz or 2 GHz band), GPS (1.5 GHz band) and information communications (Bluetooth and the like, 2.4 GHz band). Therefore, plural antennas meeting these kinds of information are required, and so it is necessary to more miniaturize these plural antennas for housing the antennas in a case.

There are, for example, an antenna for GPS and an antenna for automatic fare collection system as automobile antennas, and these antennas are desirably miniaturized because there is a possibility that the field of vision may be obstructed, or the antenna may come into contact with a vehicle occupant when installed in a vehicle.

A great number of radiocommunication instruments such as a TV, a radio, a GPS, an automatic fare collection system terminal, a portable telephone and an inter-vehicle distance sensor is installed in a motorcar. The frequency bands used for these radiocommunication instruments are different from one another. Therefore, it is necessary to miniaturize each antenna element for installing plural antennas for the respective communication information instruments different in frequency bands used.

A personal computer (PC), in which antennas for information communications such as wireless LAN, Wi-Fi and further WiMax, which is a next-generation communication, are installed, has been developed. The antennas used for these information communications are also required to be miniaturize and lightened for housing them in a case with a limited space.

A dielectric antenna easy in production, and capable of controlling the dimensions of a circuit pattern with high precision and lessening a scatter of performance is often used as an application antenna mass-produced for portable telephones, motorcars, personal computers, etc. The dielectric antenna has, for example, a structure that a copper foil is laminated on a substrate formed of a dielectric, and a circuit pattern is formed on the copper foil.

In order to miniaturize the dielectric antenna, it is necessary to raise the relative dielectric constant of the dielectric antenna. When the relative dielectric constant of the dielectric antenna is raised, the wavelength of a propagating signal becomes short, and so the miniaturization is allowed. However, a conventional dielectric material shows a tendency for its dielectric loss tangent to also rise with the rise of the relative dielectric constant. Energy loss becomes small as the dielectric loss tangent of the dielectric antenna is small, and so the performance of the antenna is improved. When the relative dielectric constant of the dielectric antenna is raised to miniaturize it, the dielectric loss tangent thereof becomes high to lower the performance of the antenna.

Japanese Patent No. 3664094 (Patent Literature 1) has heretofore disclosed a composite dielectric molded product obtained by molding a composite dielectric material containing a dielectric inorganic filler and an organic polymeric material and proposed the use of the composite dielectric molded product as a lens antenna. However, the relative dielectric constants of the composite dielectric molded products specifically shown in the respective Examples of Patent Literature 1 are relatively low.

Japanese Patent No. 3895175 (Patent Literature 2) has proposed a dielectric resin integrated antenna equipped with a dielectric formed of a dielectric resin composite material with dielectric ceramic powder having a dielectric constant (relative dielectric constant) of 20 or more and a dielectric loss tangent of 0.005 or less incorporated therein. However, the relative dielectric constants of the dielectric resin composite materials containing the ceramic powder specifically shown in the respective Examples of Patent Literature 2 are not very high, and on the other hand, the lower limit of dielectric loss tangents thereof is relatively high.

Japanese Patent Application Laid-Open No. 2005-94068 (Patent Literature 3) discloses a composite material with dielectric ceramic powder contained in a synthetic resin. The composite material shows a relative dielectric constant of 15 or more and a dielectric loss tangent of 0.01 or less in a frequency range of 100 MHz or more. However, the dielectric loss tangents of the composite materials specifically shown in the respective Examples of Patent Literature 3 are about 0.003 to 0.005 and are thus not sufficiently high though the relative dielectric constants thereof are as high as about 17 to 52 as shown in Paragraph [0023] of the description. In other words, the dielectric loss tangent of the composite material could not be reduced to the degree lower than 0.003 in the state of the art described in Patent Literature 3.

International Publication No. 2008/081773 Pamphlet (Patent Literature 4) discloses a flame-retardant resin composition containing polybutylene terephthalate, a bromine-containing flame retardant, an antimony-containing flame retardant aid and a titanic inorganic compound. The flame-retardant resin composition is used as an antenna part. However, with respect to the dielectric characteristics of the respective flame-retardant resin compositions shown in the respective Examples of Patent Literature 4, the relative dielectric constants are relatively low, and on the other hand, the lower limit of dielectric loss tangents thereof is 0.008 and relatively high.

As described above, a dielectric antenna using a dielectric material low in dielectric loss tangent while having a high relative dielectric constant, i.e., a dielectric antenna having high performance and sufficiently miniaturized has been unable to be provided according to the prior art. Therefore, there is a demand for developing an antenna substrate high in relative dielectric constant and sufficiently low in dielectric loss tangent for providing a dielectric antenna miniaturized and having high performance.

PRIOR ART LITERATURE

Patent Literature

Patent Literature 1: Japanese Patent No. 3664094
Patent Literature 2: Japanese Patent No. 3895175
Patent Literature 3: Japanese Patent Application Laid-Open No. 2005-94068
Patent Literature 4: International Publication No. 2008/081773 Pamphlet

SUMMARY OF INVENTION

Technical Problem

It is an object of the present invention to provide ceramic powder composed of titanium oxide or a titanate and capable of providing a dielectric composite material exhibiting a sufficiently high relative dielectric constant and a sufficiently low dielectric loss tangent when composited with a synthetic resin.

Another object of the present invention is to provide a dielectric composite material containing a synthetic resin and ceramic powder and having a sufficiently high relative dielectric constant and a sufficiently low dielectric loss tangent.

A further object of the present invention is to provide a dielectric antenna having a structure that an antenna part formed of a conductor circuit is provided on a dielectric substrate formed from the dielectric composite material.

The present inventors have carried out an extensive investigation with a view toward achieving the above objects. As a result, the present inventors have reached ceramic powder having a BET specific surface area within a specific limited small range as measured according to the $N_2$ absorption method and an average particle diameter within a specific range and composed of titanium oxide or a titanate. This ceramic powder is novel and exhibits excellent characteristics as ceramic powder for a dielectric composite material.

More specifically, a dielectric composite material containing a synthetic resin and the ceramic powder can exhibit a high relative dielectric constant ($\in_r$) exceeding 17 and a low dielectric loss tangent (tan δ) lower than 0.0025.

A dielectric antenna fabricated by using an antenna substrate formed from the dielectric composite material exhibiting such high relative dielectric constant ($\in_r$) and low dielectric loss tangent (tan δ) as described above can exhibit excellent property that a radiation efficiency is high in addition to the fact that it can be miniaturized. The dielectric composite material according to the present invention can impart a high dielectric constant that cannot be achieved by a synthetic resin alone and is excellent in molding and processing ability compared with ceramic alone, so that this composite material is easy to be molded into a molded product of a complicated form or three-dimensional shape by a melt processing process such as injection molding.

The present invention has been led to completion based on these findings.

Solution to Problem

According to the present invention, there is provided ceramic powder having a BET specific surface area within a range of from 0.1 to 2.0 $m^2/g$ as measured according to the $N_2$ absorption method and an average particle diameter within a range of from 0.8 to 100 μm and composed of titanium oxide or a titanate.

According to the present invention, there is also provided a dielectric composite material comprising a synthetic resin and ceramic powder, wherein the ceramic powder is at least one ceramic powder having a BET specific surface area within a range of from 0.1 to 2.0 $m^2/g$ as measured according to the $N_2$ absorption method and an average particle diameter within a range of from 0.8 to 100 μm and selected from the group consisting of titanium oxide and titanates.

According to the present invention, there is further provided a dielectric antenna having a structure that an antenna part formed of a conductor circuit is provided on a dielectric substrate formed from the dielectric composite material.

Advantageous Effects of Invention

According to the present invention, the ceramic powder, which is composed of titanium oxide or a titanate and can provide a dielectric composite material exhibiting a sufficiently high relative dielectric constant and a sufficiently low dielectric loss tangent when composited with a synthetic resin, is provided.

According to the present invention, the dielectric composite material containing a synthetic resin and the ceramic powder and having a sufficiently high relative dielectric constant and a sufficiently low dielectric loss tangent is provided. A dielectric antenna having a structure that an antenna part formed of a conductor circuit is provided on a dielectric substrate formed from the dielectric composite material according to the present invention can be miniaturized and has high performance.

DESCRIPTION OF EMBODIMENTS

The ceramic powder according to the present invention is powder composed of titanium oxide or a titanate. As the titanate, is preferred that exhibiting high dielectric characteristics, for example, calcium titanate, barium titanate, strontium titanate, magnesium titanate, lead titanate, calcium magnesium titanate or neodymium titanate. Among these ceramic powders, titanium oxide powder, calcium titanate powder and strontium titanate powder are preferred, with the calcium titanate powder being particularly preferred in that its synthesis is easy, its specific gravity is small, and a dielectric composite material exhibiting a high relative dielectric constant and a low dielectric loss tangent is easy to be provided.

The BET specific surface area of the ceramic powder according to the present invention as measured according to the $N_2$ absorption method is within a range of from 0.1 to 2.0 m²/g, preferably from 0.1 to 1.9 m²/g, more preferably from 0.15 to 1.8 m²/g. If the BET specific surface area of the ceramic powder is too small, kneading becomes difficult when such powder is highly filled into a synthetic resin, and melt processing such as injection molding also becomes difficult. If the BET specific surface area of the ceramic powder exceeds 2.0 m²/g, the resulting dielectric composite material shows a tendency to increase its dielectric loss tangent. If the BET specific surface area of the ceramic powder becomes large, the resulting dielectric composite material also shows a tendency to vary its dielectric loss tangent.

When the BET specific surface area of the ceramic powder falls within the above range, the relative dielectric constant ($\in_r$) of the resulting dielectric composite material can be made higher than 17, and the dielectric loss tangent (tan δ) thereof can be made lower than 0.0025 that is a small value, which has been unable to be achieved at the level of the prior art.

Figure 1:
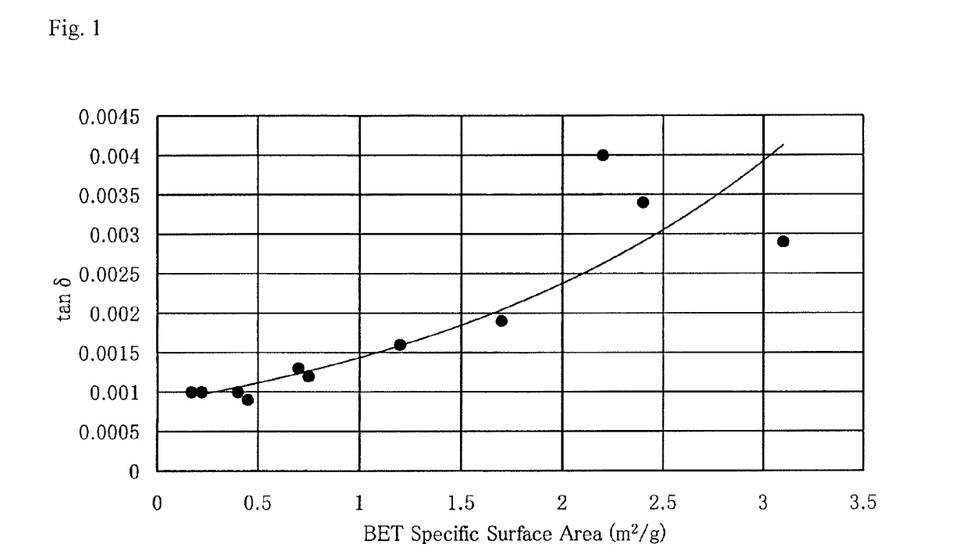
FIG. 1 diagrammatically illustrates the relation between the BET specific surface area of calcium titanate powder and the dielectric loss tangent of a dielectric composite material.

FIG. 1 illustrates the relation between the BET specific surface area of calcium titanate powder and the dielectric loss tangent (tan δ) of a dielectric composite material containing the calcium titanate powder and polypropylene. As apparent from the graph in FIG. 1, the dielectric composite material shows a tendency for its dielectric loss tangent to become markedly low as the BET specific surface area of the ceramic powder such as calcium titanate becomes small. On the other hand, the dielectric composite material shows a tendency for its dielectric loss tangent to increase as the BET specific surface area of the ceramic powder becomes large. In particular, when the BET specific surface area exceeds 2.0 m²/g, the value of the dielectric loss tangent tends to greatly vary according to the value of the BET specific surface area.

As shown in the following Table 1, the relative dielectric constant ($\in_r$) of the dielectric composite material greatly exceeds 17, and the dielectric loss tangent (tan δ) thereof is lower than 0.0025. The relative dielectric constant ($\in_r$) of the dielectric composite material preferably exceeds 18. The upper limit of the relative dielectric constant ($\in_r$) of the dielectric composite material is generally 50, often 30. The dielectric loss tangent (tan δ) of the dielectric composite material is more preferably 0.0020 or lower. The lower limit of the dielectric loss tangent (tan δ) of the dielectric composite material is generally 0.0003, often 0.0005. As described above, a dielectric composite material having particular dielectric characteristics formed of a combination of a high relative dielectric constant and a low dielectric loss tangent can be obtained by using the ceramic powder according to the present invention. The relative dielectric constant and dielectric loss tangent of the dielectric composite material are values obtained by measuring a relative dielectric constant and a dielectric loss tangent under conditions of 25° C. in temperature and 2.5 GHz in frequency by means of a perturbation-type space resonator manufactured by KEYCOM Corp.

Figure 2:
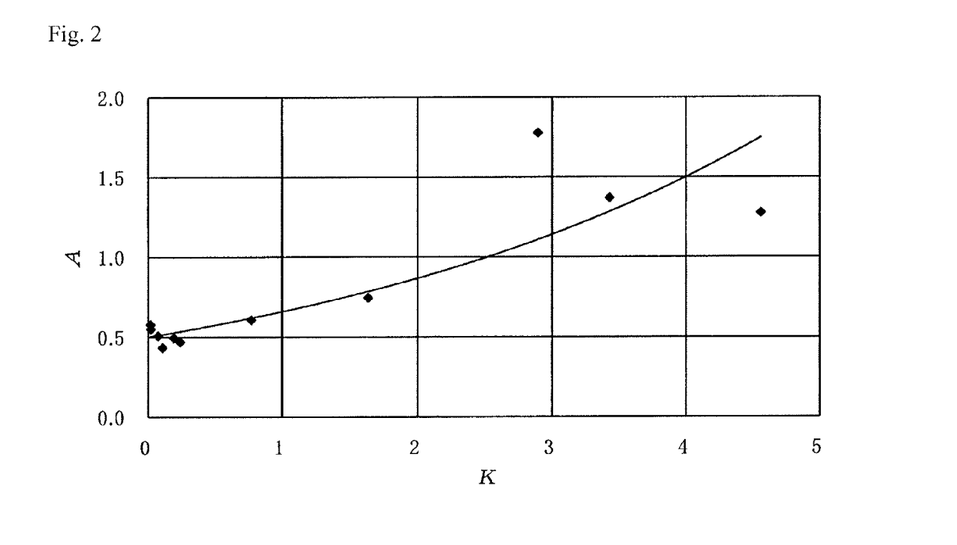
FIG. 2 diagrammatically illustrates the relation between K and A.

A ratio of BET specific surface area/average particle diameter is indicated as a K value (K=BET specific surface area/ Average particle diameter) on the basis of the relation between the BET specific surface area (m²/g) and the average particle diameter (μm) of the ceramic powder according to the present invention. On the other hand, since the dielectric loss tangent (tan δ) of the dielectric composite material according to the present invention varies according to the relative dielectric constant ($\in_r$), it is desirable from the viewpoint of performance evaluation that the dielectric composite material is normalized fixedly to the relative dielectric constant according to Equation, A=[tan δ/($\in_r$−1)]×10000 to define the relation to the K value. When the correlation between K and A is investigated on the basis of the data shown in Table 1 and FIG. 1, a graph illustrated in FIG. 2 is obtained. From the graph illustrated in FIG. 2, it is understood that the K value is preferably 2.5 or less, more preferably 2.3 or less, particularly preferably 2.0 or less. The lower limit of the K value is 0.001, often 0.01.

The average particle diameter of the ceramic powder according to the present invention is within a range of from 0.8 to 100 μm, preferably from 0.9 to 50 μm, more preferably from 1 to 30 μm, particularly preferably from 1 to 15 μm. If the average particle diameter of the ceramic powder is too small, it is difficult to sufficiently lessen the BET specific surface area thereof in addition to difficulty in handling. If the average particle diameter of the ceramic powder is too small, melt kneading and melt processing are liable to become difficult when such powder is highly filled into a synthetic resin. If the average particle diameter of the ceramic powder is too great, an antenna substrate formed from a dielectric composite material containing such ceramic powder is liable to cause a scatter of dielectric characteristics, and the surface characteristics thereof are also liable to be impaired. If the average particle diameter of the ceramic powder is too great, problems such as abrasion of an injection molding machine are liable to be caused. The average particle diameter of the ceramic powder is a value measured according to the air permeability method (Fischer method).

The crystallinity of the ceramic powder according to the present invention is preferably 80% or higher, more preferably 90% or higher, particularly preferably 95% or higher. The crystallinity of the ceramic powder is high, whereby such advantages that the ceramic powder exhibits a high relative dielectric constant and a low dielectric loss tangent can be gained. The crystallinity of the ceramic powder is a value measured on the basis of an intensity ratio of a main peak of a perovskite crystal structure to a peak of another crystal structure according to X-ray diffraction. The ceramic powder according to the present invention is particularly preferably such that the crystallinity is controlled to 95% or higher by sufficiently conducting burning. The upper limit of the crystallinity is 99% or 100%.

The apparent density of the ceramic powder according to the present invention as measured according to Japanese Industrial Standard JIS K 5101 is within a range of preferably from 0.8 to 10 g/cm³, more preferably from 0.9 to 5 g/cm³. This apparent density may be often controlled within a range of from 1.0 to 2.0 g/cm³. If the apparent density of the ceramic powder is too small, melt kneading and melt processing are liable to become difficult when such powder is highly filled into a synthetic resin. Ceramic powder too great in apparent density is difficult to be synthesized.

The ceramic powder according to the present invention is desirably that containing 5 to 50% by volume, preferably 10 to 40% by volume of small particles, the particle diameter of primary particles of which is 1.0 μm or smaller, and 50 to 95% by volume, preferably 60 to 90% by volume of large particles, the particle diameter of primary particles of which exceeds 1.0 μm. If the proportion of the small particles is too high, melt kneading and melt processing are liable to become difficult when such powder is highly filled into a synthetic resin. If the proportion of the small particles is too high, the BET specific surface area of such ceramic powder becomes large when such powder is highly filled into a synthetic resin, and so the amount of the synthetic resin covering the surface of the ceramic powder is lessened. As a result, the ceramic power aggregates, or particles of the ceramic powder cannot bind to each other, and so strength is lowered. If the proportion of the large particles is too high, the surface roughness of the resulting substrate is liable to become great. If the proportion of the large particles is too high, the inner surface of a melt kneading machine such as a twin-screw extruder, or an injection molding machine is liable to be abraded.

The small particles and the large particles are used in combination at a proper proportion, whereby such defects as described above can be overcome. In other words, when both particles are used in combination, melt kneading and melt processing become easy, and binding of the ceramic powder with the synthetic resin becomes strong, and so the strength of the resulting substrate becomes high. In addition, such ceramic powder can be highly filled, and a dielectric composite material having a high dielectric constant can be easily provided. The shape of the ceramic particles can be observed by an electron microphotograph. The large particles, the average particle diameter of primary particles of which exceeds 1.0 μm, are not those obtained by aggregating the small particles as secondary particles.

The ceramic powder according to the present invention can be synthesized as powder having desired BET specific surface area and average particle diameter by controlling the composition of a raw material, granulizing conditions, burning conditions such as a burning temperature, grinding conditions, etc.

The ceramic powder according to the present invention is preferably that obtained by sufficiently burning a raw material at a high temperature. The burning temperature is within a range of preferably from 1,150 to 1,500° C., more preferably from 1,180 to 1,300° C. The burning time is of the order of generally 0.5 to 10 hours, preferably 1 to 5 hours though it varies according to the burning temperature. Ceramic powder high in crystallinity can be obtained by sufficiently burning the raw material. In addition, ceramic powder capable of providing a dielectric composite material exhibiting a low dielectric loss tangent when blended with a synthetic resin can be obtained by sufficiently burning the raw material. After the burning, ceramic powder can be obtained according to a method, in which the burned product is ground so as to give a predetermined average particle diameter, and the ground product is classified as needed.

In order to synthesize, for example, calcium titanate powder, the powder can be synthesized according to a method, in which calcium carbonate and titanium oxide are mixed in such a manner that a molar ratio of Ca:Ti falls within a range of from 45:55 to 55:45, the resultant mixture is burned at a temperature of preferably 1,150 to 1,500° C., more preferably 1,180 to 1,300° C., the burned product is ground so as to give a predetermined average particle diameter, and the ground product is classified as needed.

The crystal structure of the ceramic powder such as calcium titanate is preferably a perovskite crystal structure.

The dielectric composite material according to the present invention is a dielectric composite material containing a synthetic resin and ceramic powder. The ceramic powder is at least one ceramic powder having a BET specific surface area within a range of from 0.1 to 2.0 m²/g as measured according to the $N_2$ absorption method and an average particle diameter within a range of from 0.8 to 100 μm and selected from the group consisting of titanium oxide and titanates. As the ceramic powder, may be used that having the above-described properties.

As the synthetic resin, may be used a thermosetting resin such as an epoxy resin or thermosetting polyimide resin. However, a thermoplastic resin is preferably used in that the resulting dielectric composite material can be subjected to melt molding and processing such as injection molding.

Preferable examples of the thermoplastic resin include polyolefin resins such as polyethylene (low density polyethylene, medium density polyethylene, high density polyethylene, linear low density polyethylene, very low density polyethylene) and polypropylene; polystyrene resins such as polystyrene, syndiotactic polystyrene and modified polystyrene; poly(phenylene oxide) resins; and poly(phenylene sulfide) resins. In addition to these resins, examples of the thermoplastic resin include liquid crystal polymers, ABS resins, thermoplastic polyester resins, polyacetal resins, polyamide resins, methylpentene resins, cycloolefin resins, polycarbonate resins, heat-fusible fluororesins, thermoplastic polyimide resins, polyether-imide resins. These synthetic resins may be used either singly or in any combination thereof.

Among these synthetic resins, resins low in dielectric loss tangent in a high frequency range, such as polyolefin resins, polystyrene resins, poly(phenylene oxide) resins and poly(phenylene sulfide) resins, are preferred. Among these synthetic resins, polyolefin resins are preferred from the viewpoints of dielectric characteristics, melt processability, etc., and polypropylene is particularly preferred from the viewpoints of heat resistance and ceramic-filling ability.

As polypropylene, may be used, for example, a homopolymer, random copolymer, block copolymer. The copolymer is a copolymer of propylene and ethylene or an α-olefin (1-butene, 1-hexene, 4-methyl-1-pentene, 1-octene or the like). The melt flow rate (MFR) of polypropylene as measured according to ASTM D 1238 is within a range of generally from 1 to 55 g/10 min., preferably from 1.4 to 50 g/10 min. The MFR of polypropylene is particularly preferably within a range of from 10 to 40 g/10 min. from the viewpoint of melt processability such as injection molding when the ceramic powder is highly filled thereinto. However, the MFR is not limited to this range.

The content of the ceramic powder in the dielectric composite material is preferably 30 to 80% by volume. In order to achieve a sufficiently high relative dielectric constant, the content is more preferably 42 to 75% by volume, particularly preferably 45 to 70% by volume. In order to achieve the relative dielectric constant of, for example, about 18, 75% by weight (42% by volume) of the ceramic powder may be caused to be contained. If the content of the ceramic powder is too low, it is difficult to provide a dielectric composite material having a desired high relative dielectric constant. If the content of the ceramic powder is too low, the ceramic powder is liable to be oriented in a synthetic resin matrix. If the content of the ceramic powder is too high, the melt processability of the resulting dielectric composite material is deteriorated. The % by volume of the ceramic powder can be calculated out on the basis of the specific gravity of the ceramic powder, the specific gravity of the synthetic resin and the mixing ratio of the ceramic powder to the synthetic resin.

As the ceramic powder, titanium oxide and various titanates may be used either singly or in any combination thereof. A small amount (at most 30% by volume, often at most 20% by volume or 10% by volume based on the volume of the whole ceramic powder) of another ceramic powder may be used in combination within limits not impeding the objects of the present invention. As the ceramic powder, is preferred calcium titanate.

As a production method of the dielectric composite material according to the present invention, is preferred a pelletizing method by a process, in which the synthetic resin and the ceramic powder are fed to a single-screw or twin-screw extruder at a predetermined ratio and melt-kneaded at a temperature not lower than the melting temperature of the synthetic resin, but lower than the decomposition temperature thereof, the kneaded product is extruded from a die fitted at the tip of the extruder into a strand, and the strand is cut while cooling it. The pellets of the dielectric composite material are used to conduct melt processing such as injection molding, whereby a molded product having a uniform composition can be obtained. As another production method of the dielectric composite material according to the present invention, may also be adopted a method of mixing the respective components by means of a batch-wise mixer such as a kneader or Banbury.

The ceramic powder according to the present invention can provide a dielectric composite material exhibiting an extremely low dielectric loss tangent without containing any rare metal. In order to provide a dielectric composite material, it is necessary to grind a burned product after burning. However, the properties of the ceramic are varied by this grinding. According to the ceramic powder of the present invention, a dielectric composite material exhibiting a high relative dielectric constant and a markedly low dielectric loss tangent can be provided by kneading the powder with the synthetic resin though the mass (burned product) fused by burning is ground. The ceramic powder composed of titanium oxide or the titanate having such physical properties and characteristics as described above is novel, and since it has such physical properties and characteristics, a dielectric composite material exhibiting excellent characteristics can be provided by kneading it with the synthetic resin.

Since the dielectric composite material according to the present invention exhibits a high relative dielectric constant and a low dielectric loss tangent and is easy to be melt-processed by injection molding or the like, this composite material can be widely used in technical fields of which these dielectric characteristics are required. A typical example of the technical fields of which these dielectric characteristics are required includes an antenna substrate of a dielectric antenna.

Examples of the dielectric antenna include microstrip antennas (patch antennas), slot antennas, spiral antennas and dipole antennas. Other examples include integrated antennas obtained by integrally uniting a plurality of patch antennas different in frequency band from each other; hybrid antennas obtained by arranging a plurality of antennas on a circuit substrate; and lens antennas including a lens body molded from a dielectric composite material.

Methods for molding the dielectric composite material according to the present invention into an antenna substrate include injection molding, compression molding, extrusion and roll molding (forming). Among these, injection molding is preferred because it is excellent in molding and processing ability, and a molded product of a complicated form can be easily molded. The form of the antenna substrate is optional and may be any of a flat plate, a rectangular parallelopiped and other molded products having a complicated three-dimensional structure. A dielectric antenna equipped with an antenna substrate formed of the dielectric composite material according to the present invention can be shaped into a complicated form in addition to the fact that it can be miniaturized, so that such an antenna can be easily housed in cases of various shapes.

The dielectric antenna has a structure that a conductor circuit is formed on an antenna substrate having any of various forms such as a flat plate and a rectangular parallelopiped. A specific example of the dielectric antenna is described with reference to FIG. 3.

A flat plate is molded with the dielectric composite material to prepare an antenna substrate 31 of 40 mm in length, 40 mm in width and 2 mm in thickness. A copper foil tape (CUL025T or CUL-50T, product of TAKACHI ELECTRONICS ENCLOSURE CO., LTD.) 32 for grounding is stuck on the whole back surface of the substrate [FIGS. 3 (a) and (c)]. A copper foil tape somewhat larger than a necessary size is stuck on a portion near to a center of a front surface (antenna surface) of the substrate and cut into a size according to the specified dimensions with a cutter to form a patch 33 composed of the copper foil [FIG. 3 (b)]. Mounting holes 34 each having a diameter of 3 mm are made in 4 corners of the substrate. A feeding point hole 35 passing through the copper foils 32 and 33 and having a diameter of 1.4 mm is made. An SMA connector 36 is installed on the back surface of the substrate [FIGS. 3 (a) and (c)]. A feeding point pin 37 is soldered 38. Thereafter, the patch 33 is finely adjusted while confirming reflection properties (SWR) at the SMA connector 36.

Methods for forming a conductor circuit on the antenna substrate include, for example, a method, in which a metal such as copper and/or nickel is plated by an electroless plating method, and the plating layer is etched by a photolithographic method so as to give a desired pattern, in addition to the method of sticking the copper foil tape.

EXAMPLES

The present invention will hereinafter be described more specifically by Examples and Comparative Examples. Measuring methods and evaluating methods of various physical properties and characteristics or properties are as follows.

(1) Average Particle Diameter

The average particle diameter was measured according to the air permeability method (Fischer method).

(2) BET Specific Surface Area

The BET specific surface area was measured according to the BET method by $N_2$ absorption.

(3) Apparent Density

The apparent density was measured according to the method described in JIS K 5101.

(4) Crystallinity

The crystallinity was calculated out on the basis of an intensity ratio of a main peak of a perovskite crystal structure to a peak of another crystal structure according to X-ray diffraction.

(5) Particle Shape

A primary particle diameter and a particle shape were determined by a scanning electron microphotograph.

(6) Relative Dielectric Constant and Dielectric Loss Tangent

Figure 4:
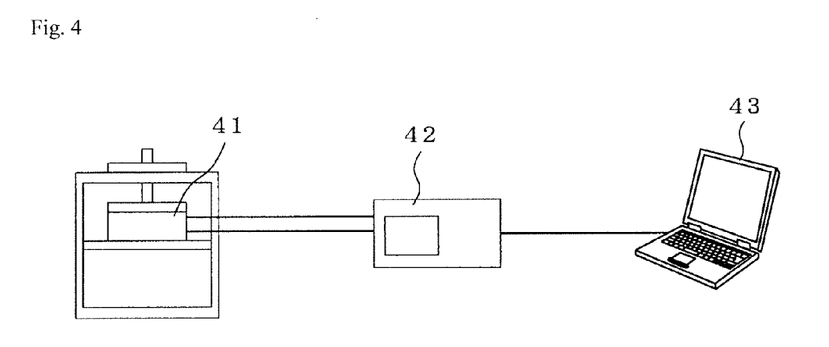
FIG. 4 is an explanatory view illustrating a means for evaluating a relative dielectric constant and a dielectric loss tangent.

A perturbation-type space resonator manufactured by KEYCOM Corp. was used to measure a relative dielectric constant ($\in_r$) and a dielectric loss tangent (tan δ) under conditions of 25° C. in temperature and 2.5 GHz in frequency. Specifically, 3 samples of 2 mm in length, 30 mm in width and 1.5 mm in thickness were cut out of a flat plate obtained by molding a dielectric composite material. As illustrated in FIG. 4, a resonator 41, a vector network analyzer 42 and a personal computer 43 were connected to one another to conduct measurement at 2.5 GHz in measuring frequency and 25° C. in measuring environmental temperature. Measured values of a relative dielectric constant and a dielectric loss tangent were determined from differences in resonant frequency and Q factor between a case where the sample was inserted into the resonator and a case where no sample was inserted into the resonator. An average value (n=3) of the measured values of the 3 samples was determined.

(7) Evaluating Method of Antenna

Figure 5:
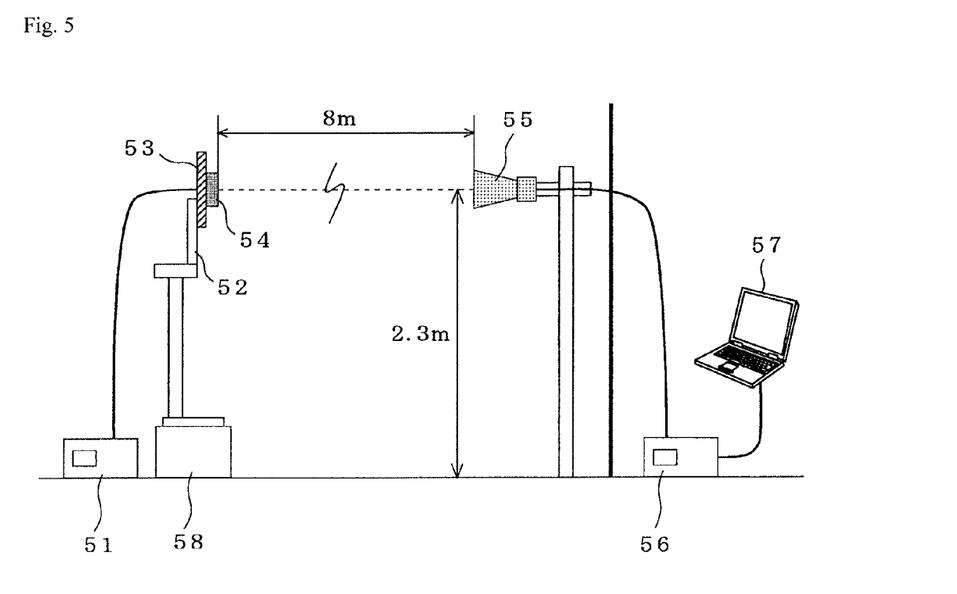
FIG. 5 is an explanatory view illustrating an evaluating method of an antenna.

An apparatus illustrated in FIG. 5 was used to evaluate an antenna. A signal generator (Anritsu Corporation, MG3694A) 51 is connected to a reflecting plate (made of aluminum, 100 mm×100 mm) 53 mounted on a fixture (acrylic plate) 52, and an antenna (patch antenna) 54 is mounted on one surface of the reflecting plate 53. A double-ridged antenna (manufactured by ADVANTEST CORPORATION, model name: TR 17206, frequency: 1 to 18 GHz, average power gain: 10.7 dB) 55 is arranged in opposition to the antenna, and the double-ridged antenna 55 is connected to a spectrum analyzer (manufactured by Anritsu Corporation, MS2668C) 56. A measured result is displayed on a personal computer 57. The instruments from the signal generator 51 to the double-ridged antenna 55 are arranged in an anechoic chamber of 20 to 30° C.

Example 1

Calcium carbonate and titanium oxide were weighed and mixed so as to give a desired composition [Ca:Ti=50:50 (mol/mol)] and burned for 2 hours at 1,200° C. in an electric furnace. The burned product was ground to obtain calcium titanate powder (particles) having an average particle diameter of 1.6 µm, a BET specific surface area of 1.2 m²/g, an apparent density of 1.2 g/cm³ and a crystallinity of 98% and containing 30% by volume of small particles, the particle diameter of primary particles of which was 1.0 µm or smaller, and 70% by volume of large particles, the particle diameter of primary particles of which exceeded 1.0 µm.

Comparative Example 1

A burned product was prepared under the same conditions as in Example 1 except that the burning temperature was changed to 1,100° C., and the burned product was ground to obtain calcium titanate powder (particles) having an average particle diameter of 0.6 µm, a BET specific surface area of 3.4 m²/g, an apparent density of 0.6 g/cm³ and a crystallinity of 94% and containing 70% by volume of small particles, the particle diameter of primary particles of which was 1.0 µm or smaller, and 30% by volume of large particles, the particle diameter of primary particles of which exceeded 1.0 µm.

Example 2

A burned product was prepared in the same manner as in Example 1, and the grinding conditions of the burned product were changed to obtain calcium titanate powder having its corresponding average particle diameter and BET specific surface area shown in Table 1. This calcium titanate powder and polypropylene (AZ546, product of Sumitomo Chemical Co., Ltd.; MRF=30 g/10 min. as measured according to ASTM D 1238) were fed to a twin-screw extruder at a weight ratio of 85:15 (volume ratio of 57:43) and melt-kneaded at 230° C., the kneaded product was extruded from a die into a strand, and the strand was cut while quenching it, thereby preparing pellets. The pellets were fed to an injection molding machine to prepare a flat plate (sample for antenna evaluation) of 40 mm in length, 40 mm in width and 2 mm in thickness and a flat plate (used as samples for measuring a relative dielectric constant and a dielectric loss tangent by cutting it) of 40 mm in length, 40 mm in width and 1.5 mm in thickness at 220° C. The results are shown in Table 1.

Examples 3 to 9

Burned products were prepared in the same manner as in Example 1, and the grinding conditions of the burned products were changed to obtain 7 calcium titanate powders each having its corresponding average particle diameter and BET specific surface area shown in Table 1. Two flat plates for the measurements were prepared in the same manner as in Example 2 except that each of these calcium titanate powders was used. The results are shown in Table 1.

Comparative Examples 2 to 4

Burned products were prepared in the same manner as in Comparative Example 1, and the grinding conditions of the burned products were changed to obtain 3 calcium titanate powders each having its corresponding average particle diameter and BET specific surface area shown in Table 1. Two flat plates for the measurements were prepared in the same manner as in Example 2 except that each of these calcium titanate powders was used. The results are shown in Table 1.

TABLE 1

| | Average particle diameter (µm) | BET specific surface area (m²/g) | Relative dielectric constants $\epsilon_r$ | Dielectric loss tangent tan δ |
|---|---|---|---|---|
| Comp. Ex. 2 | 0.68 | 3.1 | 23.7 | 0.0029 |
| Comp. Ex. 3 | 0.76 | 2.2 | 23.5 | 0.0040 |
| Comp. Ex. 4 | 0.70 | 2.4 | 25.8 | 0.0034 |
| Example 2 | 1.04 | 1.7 | 26.5 | 0.0019 |
| Example 3 | 1.55 | 1.2 | 27.4 | 0.0016 |
| Example 4 | 3.60 | 0.7 | 27.3 | 0.0013 |
| Example 5 | 5.25 | 0.4 | 20.7 | 0.0010 |
| Example 6 | 10.7 | 0.22 | 19.2 | 0.001 |
| Example 7 | 9 | 0.17 | 18.3 | 0.001 |
| Example 8 | 3.1 | 0.75 | 26.5 | 0.0012 |
| Example 9 | 4.1 | 0.45 | 21.7 | 0.0009 |

<Relation Between BET Specific Surface Area and Dielectric Loss Tangent>

On the basis of the results shown in Table 1, the relation between the BET specific surface area of calcium titanate powder and the dielectric loss tangent (tan δ) of a dielectric composite material containing the calcium titanate powder is illustrated in FIG. 1.

<Relation Between K and A>

The relation between the BET specific surface area and the average particle diameter of the calcium titanate powder is indicated as a K value represented by the following equation 1, and the relation between the relative dielectric constant and the dielectric loss tangent of the dielectric composite material is normalized fixedly with the relative dielectric constant according to the following equation 2.

$$K = \text{BET specific surface area (m}^2\text{/g)/Average particle diameter (µm)} \qquad 1$$

$$A = [\tan \delta / (\epsilon_r - 1)] \times 10000 \qquad 2$$

On the basis of the results shown in Table 1, the relation between K and A is illustrated in FIG. 2. Cases where the K value is 2.5 or less correspond to Examples 2 to 9, and cases where the K value is larger than 2.5 correspond to Comparative Examples 2 to 4.

<Performance Evaluation of Antenna>

Figure 3:
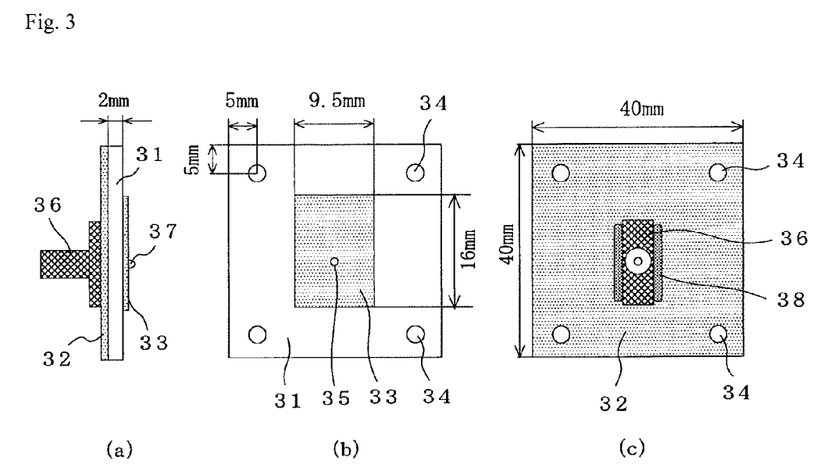
FIG. 3 is an explanatory view specifically illustrating a patch antenna.

The flat plates prepared in Examples 2 to 9 and Comparative Examples 2 to 4 were used to prepare dielectric antennas (patch antennas) of the structure illustrated in FIG. 3, and the performance of the antennas was evaluated by using the evaluation system illustrated in FIG. 5 in an anechoic chamber. A rotating table 58, on which the patch antenna was mounted, was rotated from −180° to 180° to measure a reception level of waves sent from the patch antenna by the double-ridged antenna. A radiation effect was determined from this measured result and a theoretical value. The results are shown in Table 2.

TABLE 2

|  | Radiation efficiency (%) |
| --- | --- |
| Comparative Example 2 | 34 |
| Comparative Example 2 | 29 |
| Comparative Example 3 | 29 |
| Example 2 | 43 |
| Example 3 | 46 |
| Example 4 | 50 |
| Example 5 | 61 |
| Example 6 | 60 |
| Example 7 | 58 |
| Example 8 | 51 |
| Example 9 | 63 |

INDUSTRIAL APPLICABILITY

The ceramic powder composed of titanium oxide or a titanate, and the dielectric composite material according to the present invention can be suitably utilized in the use of an dielectric antenna substrate of which a high relative dielectric constant and a low dielectric loss tangent are required.

REFERENCE SIGNS LIST

31 Antenna substrate
32 Copper foil tape
33 Copper foil tape (patch)
34 Mounting holes
35 Feeding point pinhole
36 SMA connector
37 Feeding point pin
38 Solder
41 Resonator
42 Vector network analyzer
43 Personal computer
51 Signal generator
52 Fixture
53 Reflecting plate
54 Antenna
55 Double-ridged antenna
56 Spectrum analyzer
57 Personal computer
58 Rotating table

The invention claimed is:

1. A dielectric composite material comprising a synthetic resin and ceramic powder, wherein
   (i) the ceramic powder is at least one ceramic powder having a BET specific surface area within a range of from 0.1 to 2.0 $m^2/g$ as measured according to the $N_2$ absorption method and an average particle diameter within a range of from 0.8 to 30 μm as measured according to the air permeability method and selected from the group consisting of titanium oxide and titanates,
   (ii) the ceramic powder has an apparent density within a range of from 0.8 to 10 $g/cm^3$ as measured according to Japanese Industrial Standard JIS K 5101,
   (iii) the ceramic powder contains 5 to 50% by volume of small particles, the particle diameter of primary particles of which is 1.0 μm or smaller, and 50 to 95% by volume of large particles, the particle diameter of primary particles of which exceeds 1.0 μm, and
   (iv) the ceramic powder has a K value within a range of 2.0 or less, wherein the K value is represented by the following equation:

$K$=BET specific surface area $(m^2/g)$/Average particle diameter (μm).

2. The dielectric composite material according to claim 1, wherein the ceramic powder has a crystallinity of 95% or higher as calculated out on the basis of an intensity ratio of a main peak of a perovskite crystal structure to a peak of another crystal structure according to X-ray diffraction.

3. The dielectric composite material according to claim 1, wherein the content of the ceramic powder in the dielectric composite material is within a range of from 30 to 80% by volume.

4. The dielectric composite material according to claim 1, wherein the synthetic resin is at least one thermoplastic resin selected from the group consisting of polyolefin resins, polystyrene resins, poly(phenylene oxide) resins and poly(phenylene sulfide) resins.

5. The dielectric composite material according to claim 1, which has a relative dielectric constant exceeding 17 and a dielectric loss tangent lower than 0.0025 as measured under conditions of 25° C. in temperature and 2.5 GHz in frequency.

6. A dielectric antenna having a structure that an antenna part formed of a conductor circuit is provided on a dielectric substrate formed from the dielectric composite material according to claim 1.

* * * * *